United States Patent
Schütze et al.

(10) Patent No.: US 10,351,034 B2
(45) Date of Patent: Jul. 16, 2019

(54) PRESSURE MEDIUM DISTRIBUTOR, PNUEMATIC ADJUSTMENT ARRANGEMENT FOR A VEHICLE SEAT, VEHICLE SEAT, AND METHOD FOR PRODUCING A PRESSURE MEDIUM DISTRIBUTOR FOR A PNEUMATIC ADJUSTMENT ARRANGEMENT

(71) Applicant: Conti Temic microelectronic GmbH, Nürnberg (DE)

(72) Inventors: Thomas Schütze, Paunzhausen (DE); Johann Steinberger, Brunnen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 310 days.

(21) Appl. No.: 15/507,472

(22) PCT Filed: Aug. 27, 2015

(86) PCT No.: PCT/EP2015/069650
§ 371 (c)(1),
(2) Date: Feb. 28, 2017

(87) PCT Pub. No.: WO2016/034491
PCT Pub. Date: Mar. 10, 2016

(65) Prior Publication Data
US 2017/0305308 A1 Oct. 26, 2017

(30) Foreign Application Priority Data
Sep. 1, 2014 (DE) .................. 10 2014 217 429

(51) Int. Cl.
*B60N 2/66* (2006.01)
*B60N 2/90* (2018.01)
*F15B 15/10* (2006.01)

(52) U.S. Cl.
CPC ............. *B60N 2/914* (2018.02); *B60N 2/665* (2015.04); *B60N 2/976* (2018.02); *F15B 15/10* (2013.01)

(58) Field of Classification Search
CPC ........ B60N 2/665; B60N 2/914; B60N 2/976; F15B 15/10
(Continued)

(56) References Cited

U.S. PATENT DOCUMENTS 3,303,518 A * 2/1967 Ingram ................ A47C 27/081
5/633
4,433,708 A * 2/1984 Hashimoto ............ B60N 2/914
141/114
(Continued)

FOREIGN PATENT DOCUMENTS

| EP | 2465723 A2 | 6/2012 |
|---|---|---|
| WO | 9106274 A1 | 5/1991 |

OTHER PUBLICATIONS

International Search Report and Written Opinion for International Application No. PCT/EP2015/069650, dated Nov. 9, 2015, 9 pages.
(Continued)

*Primary Examiner* — Milton Nelson, Jr.
(74) *Attorney, Agent, or Firm* — RatnerPrestia (57) ABSTRACT

A pressure medium distributor, for a pneumatic adjustment arrangement of a vehicle seat. The pressure medium distributor has a distribution element including at least one first and one second film connected to each other along a connection seam in order to form a first and at least one second pressure medium chamber. The pressure medium distributor has a first pressure medium inlet line to admit the pressure medium into the first pressure medium chamber, and at least one second pressure medium inlet line to admit the pressure medium into the at least one second pressure medium chamber. At least one first pressure medium outlet (Continued)

line is provided for discharge of the pressure medium from the first pressure medium chamber, and at least one second pressure medium outlet line is provided for discharge of the pressure medium from the second pressure medium chamber creating a pressure medium distributor which is flexible.

13 Claims, 4 Drawing Sheets

(58) Field of Classification Search
USPC .......................................... 297/284.6, DIG. 3
See application file for complete search history.

(56) References Cited

U.S. PATENT DOCUMENTS

| | | | | |
|---|---|---|---|---|
| 4,497,517 A | * | 2/1985 | Gmeiner | A47C 7/425 |
| | | | | 297/284.6 |
| 4,840,425 A | | 6/1989 | Noble | |
| 4,915,124 A | * | 4/1990 | Sember, III | A47C 7/467 |
| | | | | 137/223 |
| 5,975,629 A | | 11/1999 | Lorbiecki | |
| 2013/0127226 A1 | | 5/2013 | Beyerlein et al. | |

OTHER PUBLICATIONS

German Examination Report for German Application No. 10 2014 217 429.5, dated May 5, 2015, 3 pages.

* cited by examiner

PRESSURE MEDIUM DISTRIBUTOR, PNUEMATIC ADJUSTMENT ARRANGEMENT FOR A VEHICLE SEAT, VEHICLE SEAT, AND METHOD FOR PRODUCING A PRESSURE MEDIUM DISTRIBUTOR FOR A PNEUMATIC ADJUSTMENT ARRANGEMENT

CROSS REFERENCE TO RELATED APPLICATIONS

This application is the U.S. National Phase Application of PCT/EP2015/069650, filed Aug. 27, 2015, which claims priority to German Patent Application No. 10 2014 217 429.5, filed Sep. 1, 2014, the contents of such applications being incorporated by reference herein.

FIELD OF THE INVENTION

The present invention relates to a pressure medium distributor, in particular for a pneumatic adjustment arrangement of a vehicle seat. The invention further relates to a pneumatic adjustment arrangement for a vehicle seat having such a pressure medium distributor, and to a vehicle seat having a pneumatic adjustment arrangement as just mentioned. Moreover, the invention relates to a method for producing an aforementioned pressure medium distributor.

BACKGROUND OF THE INVENTION

In modern vehicle seats, bladders as adjustment elements which can be filled with a pressure medium, in particular with compressed air, are situated in a region of the seat surface or seat back (jointly referred to as seat bearing surface), and can be supplied with pressure medium via a respective pressure medium line. Filling a respective bladder with pressure medium increases the volume thereof, which consequently means that the properties of a seat back or seat surface can be changed in terms of contour. In addition to a static setting of the contour of the seat back or seat surface, for example to provide a lumbar support, it is also possible here to afford massage functions for an occupant seated in the vehicle seat by regularly or dynamically changing the contour of the seat back or seat surface. In order to fill a bladder with pressure medium, the latter is first generated by a pressure source, for example by a compressor, and guided to a respective bladder via a corresponding valve, in particular an electropneumatic valve, in a control device. Particularly to realize massage functions, it is advantageous to provide a plurality of bladders in the vehicle seat so as to create an appropriate massage program for the respective occupant. Here, the use of a plurality of bladders also requires the use of pressure medium distributors. However, owing to their rigid design, they can usually be integrated only with considerable effort into the generally only limited installation space in a vehicle seat.

Document U.S. Pat. No. 4,840,425 A, which is incorporated by reference describes an inflatable padded seating arrangement, wherein the arrangement alternates areas of the supporting contacts of the inflatable portions of the arrangement with the body of a user seated in the seating arrangement while providing a continuous overall cushioned support to the user to thereby counteract medical problems or fatigue caused by prolonged sitting. The arrangement comprises a plurality of chambers which can be filled with pressure medium, said chambers being supplied in alternating fashion with pressure medium by means of a control mechanism via T-pieces or rigid pressure medium distributors.

SUMMARY OF THE INVENTION

An aspect of the present invention thus is a flexible and space saving possibility for pressure medium distribution, in particular for a pneumatic adjustment arrangement in a vehicle seat.

In this context, a pressure medium distributor, which is in particular configured for a pneumatic adjustment arrangement of a vehicle seat, comprises the following features. It has a distribution element which comprises at least one first and one second film which are connected to one another along a connection seam in order to form a first and at least one second pressure chamber. Here, the at least one first and the one second film can be respective separate films or can else also be corresponding portions of a single film. Furthermore, the pressure medium distributor has a first pressure medium inlet line for letting the pressure medium into the first pressure medium chamber, and at least one second pressure medium inlet line for letting the pressure medium into the at least one second pressure medium chamber.

Also provided are at least one first pressure medium outlet line for letting the pressure medium out of the first pressure medium chamber, and at least one second pressure medium outlet line for letting the pressure medium out of the at least one second pressure medium chamber. The construction of the pressure medium distributor from two flexible films thereby creates a pressure medium distributor which, on the one hand, is space-saving and is adaptable in terms of shape when being installed into its intended location, as in a vehicle seat. Moreover, the use of flexible films for the pressure medium distributor makes it possible to reduce the outlay of production and the material costs. In addition, the flexible design of the pressure medium distributor also reduces the operational noise during the distribution process since switching noises, caused for example by switching valves for controlling a pressure medium flow, or flow noises at the pressure medium distributor are not transmitted and are thus decoupled.

According to one embodiment of the pressure medium distributor, the pressure medium inlet lines and/or the pressure medium outlet lines are introduced at the connection seam between the at least one first and one second film. This requires a simple production method and provides a firm seating of the pressure medium lines in the pressure medium distributor.

According to a further embodiment of the pressure medium distributor, the connection seam has a connection portion which delimits the first pressure medium chamber from the at least one second pressure medium chamber. Here, such a connection portion which separates the two chambers from one another can also be used as a portion at which the pressure medium distributor can be bent or folded in order to adapt itself or the arrangement of the pressure medium chambers to external conditions, such as, for example, an installation space defined in the driver's seat. In addition, a spacing between the pressure medium inlet lines can be set such that the latter can be connected particularly to the outlets of an arbitrary control device which prescribe a predetermined spacing.

According to a further embodiment of the pressure distributor, the connection seam is particularly formed as a weld seam. However, a connection seam in the form of an adhesive seam is also conceivable. However, the weld seam is advantageously produced by means of a high-frequency welding. Welding, in particular, allows very stable and durable connections to be produced between the two films of the pressure medium distributor.

According to a further embodiment of the pressure medium distributor, the pressure medium is a gaseous pressure medium, in particular air. In this way, simple and cost-effective filling of the bladder or bladder chamber can be achieved.

According to a further embodiment of the pressure medium distributor, a respective pressure medium chamber is assigned two or more pressure medium outlet lines. In this way, pressure medium distributors having any desired degree of distribution, for example a two/four distributor or four/eight distributor, can be provided and adapted to the corresponding intended uses.

According to a further embodiment of the pressure medium distributor, the pressure medium outlet lines (with two or more pressure medium outlet lines per pressure medium chamber) are arranged in a respective pressure medium chamber, in particular introduced into the connection seam, in such a way that they are oriented parallel to one another. Furthermore, it is conceivable that, in a respective pressure medium chamber, the respective pressure medium inlet line is also oriented parallel to the corresponding pressure medium outlet line(s).

According to a further embodiment of the pressure medium distributor, the distribution element has, in the first and/or the at least one second pressure medium chamber, a filter element for removing particles entrained in the pressure medium. Here, this filter medium is arranged in the first and/or the at least one second pressure medium chamber in such a way that it separates these pressure medium chambers into a respective first and second sub chamber. Here, in particular, the respective first pressure medium inlet line is provided for letting the pressure medium into the respective first sub chamber and the respective at least one pressure medium outlet line is provided for letting the pressure medium out of the respective second sub chamber, the pressure medium flowing from the respective first sub chamber via the respective filter element into said second sub chamber. The pressure medium distributor can thus also be embodied in a simple manner as a cost-effective filter element.

It should be mentioned that a pressure medium distributor as described above is not restricted to the motor vehicle sector but is also applicable in air and space travel, in particular in pneumatic adjustment arrangements for seats in vehicles in the field. However, it can also generally be used in pneumatic and hydraulic applications.

According to a further aspect of the invention, a pneumatic adjustment arrangement in particular for a vehicle seat having the following features is provided. It has at least one first and one second bladder as adjustment elements which can be filled with a pressure medium. Furthermore, it has a control device for the targeted provision of pressure medium to the at least one first and one second bladder. Here, the control device has a first and a second pressure medium outlet. Finally, said adjustment arrangement has a pressure medium distributor of the kind described above or an embodiment thereof, in which the first pressure medium inlet line is (fluidically) connected to the first pressure medium outlet of the control device, the second pressure medium inlet line is (fluidically) connected to the second pressure medium outlet of the control device, the at least one first pressure medium outlet line is (fluidically) connected to the at least one first bladder, and the at least one second pressure medium outlet line is (fluidically) connected to the at least one second bladder. Such a pneumatic adjustment arrangement is in particular, on the one hand, space-saving as a result of the construction of the pressure medium distributor from two flexible films and, owing to its adaptability in terms of shape, can be installed easily into its intended location, as in a vehicle seat. Moreover, as already mentioned above, the flexible design of the pressure medium distributor also reduces the operational noise during the distribution process since switching noises, caused for example by switching valves in the control device for controlling a pressure medium flow, or flow noises at the pressure medium distributor are not transmitted and are thus decoupled. This increases the comfort for an occupant who has taken up position for example in a driver's seat equipped with the pneumatic adjustment arrangement.

According to a further aspect of the invention, a vehicle seat comprising a pneumatic adjustment arrangement of the kind described above and having a seat bearing surface is provided, wherein the at least one first and second bladder are arranged below the seat bearing surface to influence the contour thereof.

According to a further aspect of the invention, a method for producing a pressure medium distributor for a pneumatic adjustment arrangement comprising the following steps is provided. An at least one first and one second film are provided. Then, at least two lines, which serve as a first and at least one second pressure medium inlet line, and at least two lines, which serve as at least one first pressure medium outlet line and at least one second pressure medium outlet line, are arranged between the at least one first and one second film. Furthermore, the at least one first and one second film are connected to one another at a connection seam to form a distribution element in such a way that a first and at least one second pressure medium chamber are formed, wherein the first pressure medium inlet line is provided for letting the pressure medium into the first pressure medium chamber, the at least one second pressure medium inlet line is provided for letting the pressure medium into the at least one second pressure medium chamber, the at least one first pressure medium outlet line is provided for letting the pressure medium out of the first pressure medium chamber, and the at least one second pressure medium outlet line is provided for letting the pressure medium out of the second pressure medium chamber.

In this way, a flexible pressure medium distributor can be provided which has properties as have already been described above.

According to one embodiment of the method, the pressure medium inlet lines and the pressure medium outlet lines are introduced at the connection seam between the at least one first and one second film.

According to one embodiment of the method, after providing the at least one first and one second film, at first the at least two lines serving as a first and at least one second pressure medium inlet line are arranged adjacently or on the at least one first film, and at least two lines serving as at least one first pressure medium outlet line and at least one second pressure medium outlet line are arranged adjacently or on the at least one second film, wherein a filter element is provided between the pressure medium inlet lines and pressure medium outlet lines. It is also possible here for the films to be laid after one another and on one another in the following order, namely by first providing the at least one first film, then placing thereon the pressure medium inlet lines, then the filter element, then the pressure medium outlet lines and finally the at least one second film. This consequently results, after connecting the films, in the first and at least one second pressure medium chamber which are respectively separated by the filter element into a first sub chamber and a second sub chamber. Here, the filter element can be formed as a lattice nonwoven or a foam material.

It should be mentioned that advantageous embodiments of the pressure medium distributor, insofar as they can be applied to the pneumatic adjustment arrangement, the vehicle seat and the method for producing the pressure medium distributor, can also be considered to be advantageous embodiments of the pneumatic adjustment arrangement, the vehicle seat and the method, and vice versa.

BRIEF DESCRIPTIONS OF THE FIGURES

Exemplary embodiments of the present invention will now be explained in more detail below with reference to the appended drawings, in which.

DETAILED DESCRIPTION OF THE PREFERRED EMBODIMENTS

Figure 1:
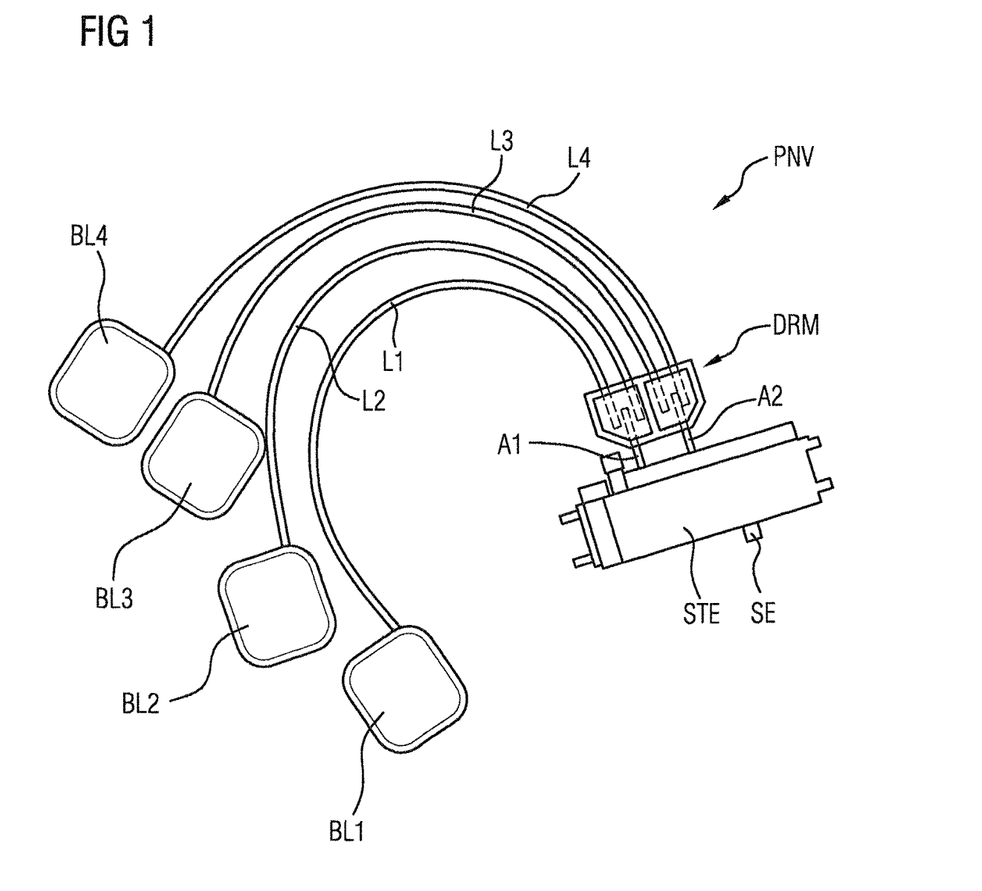
FIG. 1 shows a schematic sectional view of a pneumatic adjustment arrangement for a vehicle seat according to one embodiment of the invention.

Reference will first be made to FIG. 1, which shows a schematic illustration of a pneumatic adjustment arrangement PNV for a vehicle seat FZS (cf. in this respect also FIG. 5), in particular a motor vehicle seat, according to one embodiment of the invention. Here, the pneumatic adjustment arrangement PNV comprises four bladders BL1, BL2, BL3 and BL4 which can be filled with a pressure medium, in particular air, and which can serve as adjustment elements for influencing the seat bearing surface in a vehicle seat. In addition, the pneumatic adjustment arrangement PNV has a control device STE for the targeted provision of pressure medium to the respective bladders. For this purpose, the control device has a pressure medium inlet SE to which pressure medium is fed from a pressure medium source, such as a compressor. Valves or switching valves (not shown) are then situated in the control device in order to control the flow of pressure medium from the pressure medium inlet SE to pressure medium outlets SA1 and SA2 (in FIGS. 1 and 2).

The pneumatic adjustment arrangement PNV has, furthermore, a pressure medium distributor DRM comprising a first pressure medium inlet line A1 which is connected to the first pressure medium outlet SA1 of the control device STE, comprising a second pressure medium inlet line A2 which is connected to the second pressure medium outlet SA2 of the control device STE, comprising two (first) pressure medium outlet lines L1, L2 which are connected to the first bladder BL1 and the second bladder BL2 respectively, and comprising two second pressure medium outlet lines L3, L4 which are connected to the third bladder BL3 and the fourth bladder BL4 respectively.

Here, the pressure medium lines can be produced in particular from plastic or rubber, with it also being possible for other suitable materials to be used.

Figure 2:
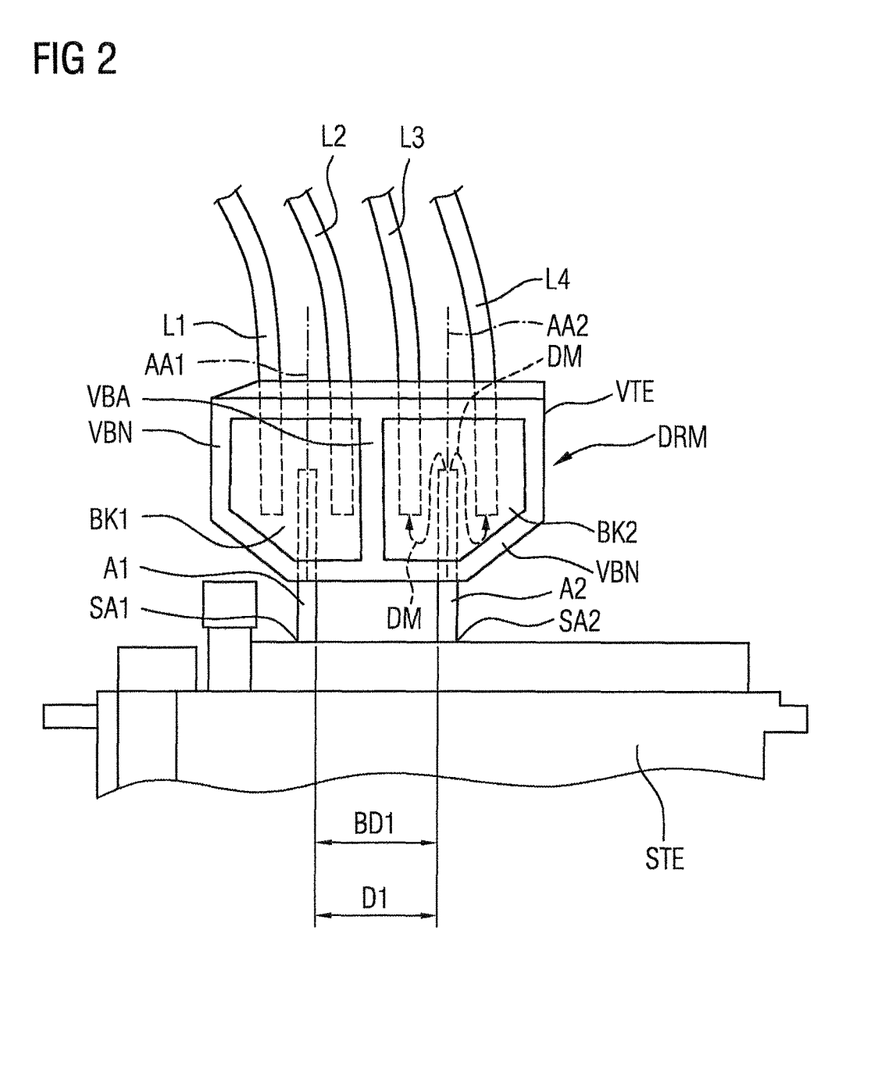
FIG. 2 shows a schematic detail view of a pressure medium distributor, shown in FIG. 1, of the pneumatic adjustment arrangement in a planar arrangement in a plan view.

Reference will now be made to FIG. 2, which shows a schematic detail view of a pressure medium distributor DRM, shown in FIG. 1, of the pneumatic adjustment arrangement PNV in a planar arrangement in a plan view. Here, the pressure medium distributor has a distribution element VTE which comprises at least one first F1 and one second F2 film (cf. in this respect also FIG. 4) which are connected to one another along a connection seam VBN in order to form a first and at least one second pressure medium chamber BK1, BK2. These films are flexible films or ones which can be changed in their shape. It is possible here that these films are also designed to be elastic.

As already mentioned above, the pressure medium distributor DRM has the first pressure medium inlet line A1 for letting the pressure medium (from the control device STE) into the first pressure medium chamber BK1, and the second pressure medium inlet line A2 for letting pressure medium into the second pressure medium chamber BK2. In addition, the pressure medium distributor has the two (first) pressure medium outlet lines L1, L2 for letting the pressure medium out of the first pressure medium chamber BK1, and the second pressure medium outlet lines L3, L4 for letting the pressure medium out of the second pressure medium chamber BK2. As is schematically illustrated in the case of the right-hand pressure medium chamber BK2, pressure medium DM is let into the pressure medium chamber BK2 through the second pressure medium inlet line A2, and then flows to the pressure medium outlet lines L3, L4 in the direction of the bladders as adjustment elements.

As can further be seen in FIG. 2, the pressure medium inlet lines A1, A2 and the pressure medium outlet lines L1 to L4 are all arranged substantially parallel to the axes AA1 and AA2 of the pressure medium inlet lines A1, A2. Furthermore, a connection portion VBA, which separates the pressure medium chambers BK1 and BK2, of the connection seam VBN is also oriented parallel to the axes AA1 and AA2.

Here, such an arrangement has the advantage in particular that the connection portion VBA can be used as a bending portion or folding portion in order to adapt a spacing BD1 between the pressure medium inlet lines A1 and A2 at the pressure medium distributor DRM to a spacing D1 between the control device outlets SA1 and SA2. In the case illustrated in FIG. 2, the spacings BD1 and D1 are identical, which means that no adaptation is necessary. However, in the case of other control devices in connection with the pressure medium distributor DRM, there may be a handling requirement.

Figure 3:
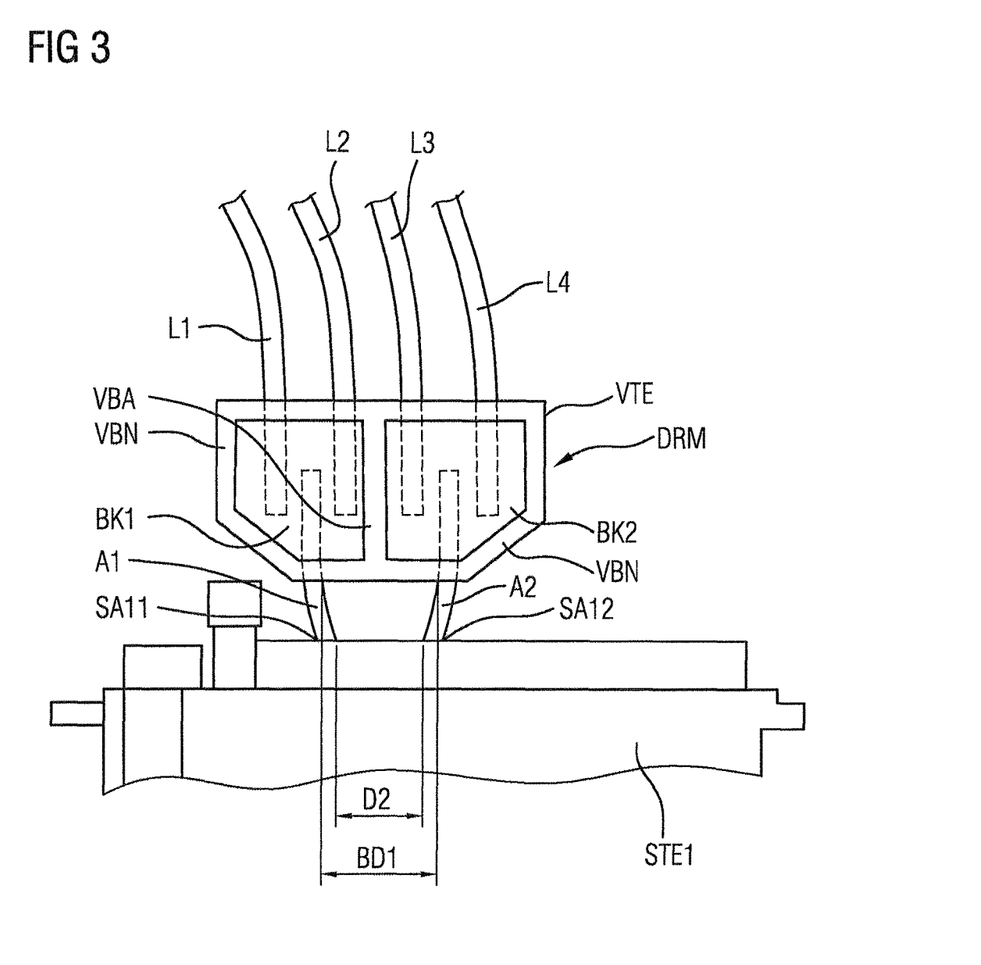
FIG. 3 shows a schematic detail view of a pressure medium distributor of the pneumatic adjustment arrangement with another control device and in a bent or folded arrangement in a plan view.

To explain this problem, reference will now be made to FIG. 3. Here, the pressure medium distributor DRM from FIG. 2 is shown again with the same line structure, it also being the case that the pressure medium inlet lines A1 and A2 lie apart again by a spacing BD1. However, this pressure medium distributor is intended to be connected to another control device STE1 which has two pressure medium outlets SA11 and SA12. These two outlets now lie apart at a spacing D2 which is less than the spacing BD1 of the pressure medium inlet lines A1 and A2. As is already indicated here in FIG. 3, the mismatched spacings thus give rise to distortions of the pressure medium inlet lines A1 and A2 which must, however, be compensated for and remedied again.

Figure 4:
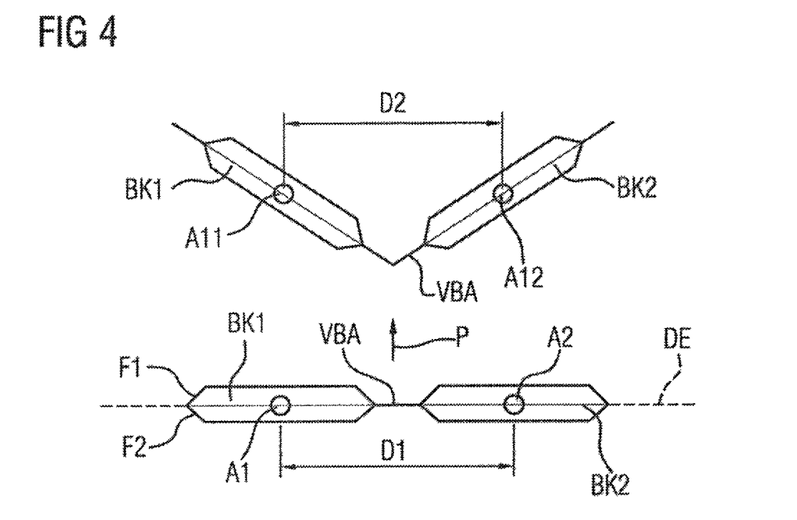
FIG. 4 shows a schematic detail view of a pressure medium distributor according to one embodiment of the invention for explaining the adaptability in terms of shape by bending or folding.

As is schematically shown in FIG. 4 in the lower portion of the figure in a view from the direction of view of the control device (that is to say perpendicular to the direction of view in FIGS. 2 and 3), the two pressure medium chambers BK1 and BK2, which are composed of the two film portions F1 and F2, and the connection portion VBA, which separates the latter, of the connection seam VBN which connects the film portions F1 and F2 to one another are oriented in a plane DE of the pressure medium distributor DRM. Here, the pressure medium inlet lines A1 and A2 in this planar orientation have a spacing D1, as can also be seen in FIG. 2 in the planarly oriented pressure medium distributor.

Figure 5:
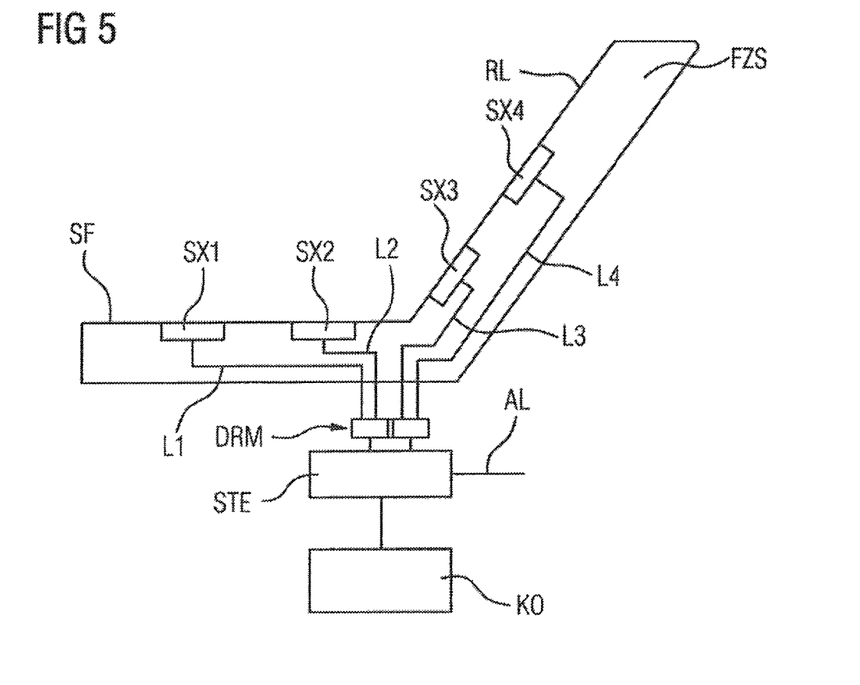
FIG. 5 shows a schematic view of a vehicle seat with a pneumatic adjustment arrangement according to one embodiment of the invention.

The connection portion can now be bent or folded so as to obtain a folded pressure medium distributor DRM, as is shown in the upper portion of FIG. 4 when following the arrow P. Bending or folding the connection portion VBA in this way now makes it possible to bring the two pressure medium inlet lines A1 and A2 closer together, namely to the spacing D2 which then corresponds to the spacing D2 between the control device outlets SA11 and SA12 of FIG. 3. The pressure medium distributor can thus be flexibly adapted to external conditions, and can be used with a multiplicity of control devices, also including the control device STE1. Reference will now be made to FIG. 5, which shows a schematic illustration of a vehicle seat FZS which is equipped with a corresponding pneumatic adjustment arrangement PNV from FIG. 1. As can be seen in FIG. 5, the vehicle seat (in particular motor vehicle seat) FZS comprises a seat surface SF on which an occupant or user can sit, and a backrest RL against which the user can lean.

The seat surface SF and the backrest RL are referred to jointly as a seat bearing surface.

In the specific example of FIG. 5, the seat surface SF comprises two adjustment elements SX1 and SX2 (corresponding to the bladders BL1 and BL2 in FIG. 1) and the backrest RL comprises two adjustment elements SX3 and SX4 (corresponding to the bladders BL3 and BL4 in FIG. 1) for adjusting a contour of the respective surfaces, on one hand for creating a corresponding supporting function (for example lumbar support) or for changing the contour of the respective bearing surfaces within the context of a massage program. The adjustment elements are in the specific case pneumatic adjustment elements which can be filled by means of compressed air as pressure medium and can thus be changed in their shape in order to perform their adjustment function, i.e. to exert a pressure perpendicular to the respective bearing surface, upward in the image plane in the case of the adjustment elements SX1 and SX2, and obliquely and upward to the left in the case of the adjustment elements SX3 and SX4. Here, compressed air is generated by a compressor KO and fed to a control device STE. From there, it is channeled in a targeted manner via two outlets to a pressure medium distributor DRM which then channels the pressure medium into the adjustment elements SX1, SX2 and SX3, SX4 in order to actuate the adjustment elements in a targeted manner. The compressed air (as pressure medium) let into the adjustment elements can then also be let out again via the compressed air lines L1 to L4, the control device STE and, at that point, via a compressed air outlet duct AL.

It is of course also conceivable for more than the bladders or adjustment elements illustrated in FIGS. 1 and 5 to be provided in a pneumatic adjustment arrangement, in order, for example, to obtain increased comfort in the realization of support or massage functions. Accordingly, more pressure medium distributors can or must then also be provided for distributing the pressure medium to the bladders or adjustment elements.

The invention claimed is:

1. A pressure medium distributor for a pneumatic adjustment arrangement of a vehicle seat, comprising:
   a distribution element which comprises at least one first film and one second film which are connected to one another along a connection seam in order to form a first pressure medium chamber and at least one second pressure medium chamber;
   a first pressure medium inlet line for letting the pressure medium into the first pressure medium chamber, and at least one second pressure medium inlet line for letting the pressure medium into the at least one second pressure medium chamber; and
   two or more first pressure medium outlet lines for letting the pressure medium out of the first pressure medium chamber, and two or more second pressure medium outlet lines for letting the pressure medium out of the second pressure medium chamber.

2. The pressure medium distributor as claimed in claim 1, in which the respective pressure medium inlet line and the corresponding two or more second pressure medium outlet lines are introduced into the connection seam in such a way that they are oriented parallel to one another.

3. The pressure medium distributor as claimed in claim 1, in which the connection seam has a connection portion which delimits the first pressure medium chamber from the at least one second pressure medium chamber.

4. The pressure medium distributor as claimed in claim 1, in which the connection seam is a weld seam.

5. The pressure medium distributor as claimed in claim 1, in which the pressure medium is a gaseous pressure medium.

6. The pressure medium distributor as claimed in claim 5, in which the pressure medium is air.

7. The pressure medium distributor as claimed in claim 1, in which the pressure medium inlet lines and the pressure medium outlet lines are introduced at the connection seam between the at least one first film and one second film.

8. The pressure medium distributor as claimed in claim 7, in which the connection seam has a connection portion which delimits the first pressure medium chamber from the at least one second pressure medium chamber.

9. The pressure medium distributor as claimed in claim 1, in which the respective pressure medium inlet line and the corresponding two or more second pressure medium outlet lines are introduced into the pressure medium chambers in such a way that they are oriented parallel to one another.

10. A pneumatic adjustment arrangement for a vehicle seat, comprising:
    at least one first bladder and one second bladder as adjustment elements which can be filled with a pressure medium;
    a control device for the targeted provision of pressure medium to the at least one first bladder and one second bladder, which control device has a first pressure medium outlet and a second pressure medium outlet (SA1, SA2); and
    a pressure medium distributor as claimed in claim 1, in which:
    the first pressure medium inlet line is connected to the first pressure medium outlet of the control device,
    the second pressure medium inlet line is connected to the second pressure medium outlet of the control device, the two or more first pressure medium outlet lines are connected to the at least one first bladder, and the two or more second pressure medium outlet lines are connected to the at least one second bladder.

11. A vehicle seat comprising a pneumatic adjustment arrangement as claimed in claim 10 and having a seat bearing surface, wherein the at least one first and second bladder are arranged below the seat bearing surface to influence the contour thereof.

12. A method for producing a pressure medium distributor for a pneumatic adjustment arrangement, comprising:

providing at least one first film and one second film;

arranging at least two lines, which serve as a first pressure medium inlet line and at least one second pressure medium inlet line, and at least four lines, which serve as two or more first pressure medium outlet lines and two or more second pressure medium outlet lines, between the at least one first film and one second film;

connecting the at least one first film and second film to one another at a connection seam in such a way that a first pressure medium chamber and at least one second pressure medium chamber are formed, wherein the first pressure medium inlet line is provided for letting the pressure medium into the first pressure medium chamber, the at least one second pressure medium inlet line is provided for letting the pressure medium into the at least one second pressure medium chamber, the two or more first pressure medium outlet lines are provided for letting the pressure medium out of the first pressure medium chamber, and the two or more second pressure medium outlet lines are provided for letting the pressure medium out of the second pressure medium chamber.

13. The method as claimed in claim 12, in which the pressure medium inlet lines and the pressure medium outlet lines are introduced at the connection seam between the at least one first and second film.

* * * * *